United States Patent [19]
Kardach et al.

[11] Patent Number: 6,014,751
[45] Date of Patent: Jan. 11, 2000

[54] METHOD AND APPARATUS FOR MAINTAINING CACHE COHERENCY IN AN INTEGRATED CIRCUIT OPERATING IN A LOW POWER STATE

[75] Inventors: James P. Kardach, Saratoga; John Horigan, Mountain View; Ravi Eakambaram, San Jose, all of Calif.; Tosaku Nakanishi, Hillsboro, Oreg.; Chih-Hung Chung, Santa Clara; Borys S. Senyk, San Jose, both of Calif.

[73] Assignee: Intel Corporation, Santa Clara, Calif.

[21] Appl. No.: 08/841,858

[22] Filed: May 5, 1997

[51] Int. Cl.[7] .................................................. G06F 1/10
[52] U.S. Cl. ........................................... 713/324; 711/141
[58] Field of Search ..................................... 711/141, 142, 711/143, 144, 145, 146; 395/750.06; 713/324

[56] References Cited

U.S. PATENT DOCUMENTS

| | | | |
|---|---|---|---|
| 5,481,731 | 3/1993 | Conary et al. . | |
| 5,530,932 | 6/1996 | Carmean et al. | 395/750.06 |
| 5,632,037 | 5/1997 | Maher et al. | 395/750.05 |
| 5,677,849 | 10/1997 | Smith | 595/750.06 |
| 5,737,746 | 4/1998 | Hardin et al. | 711/118 |

*Primary Examiner*—Eddie P. Chan
*Assistant Examiner*—Hiep T. Nguyen
*Attorney, Agent, or Firm*—Blakely, Sokoloff, Taylor & Zafman LLP

[57] ABSTRACT

A method and apparatus for operating an integrated in a reduced-power consumption state are described. The apparatus comprises power-reduction logic which, to place the integrated circuit in the reduced-power consumption state, gates a clock signal to both first and second sets of functional units within the integrated circuit. The first set of functional units is distinguished in that it is required to perform cache coherency operations within integrated circuit. The apparatus includes an input which is coupled to receive a signal indicating a memory access, to a memory resource accessible by the integrated circuit, by a further device external to the integrated circuit. In response to the assertion of this signal, the power-reduction logic propagates the clock signal to the first set of functional units, to enable this set of functional units to perform a cache coherency operation which may be necessitated by the memory access by the external device.

24 Claims, 13 Drawing Sheets

METHOD AND APPARATUS FOR MAINTAINING CACHE COHERENCY IN AN INTEGRATED CIRCUIT OPERATING IN A LOW POWER STATE

FIELD OF THE INVENTION

The present invention relates generally to the field of computers and computer systems. Specifically, the present invention relates to an integrated circuit capable of operating in a low-power state, and to a method of maintaining cache coherency when the integrated circuit is operating in the low-power state.

BACKGROUND OF THE INVENTION

One of many techniques of reducing power consumption within an integrated circuit (IC), such as a processor, is to stop or block a clock signal to a portion or to the whole of the processor. This method may require the assertion of a "stop clock" signal, upon which a processor enters a state of low power consumption (i.e. a low-power state) in which many functional units of the processor are no longer clocked. In order to maintain the performance advantages provided by cache memories associated with a processor, it is desirable that cache coherency be maintained, even when the processor is in a low-power state.

Many computer systems employ multiple processors. At any one time, one or more of these processors may be in a low-power state while others may continue to operate on data while in a fully powered state. In order to maintain cache coherency in such computer systems, the processors operating in low-power states must monitor and respond to a number of signals resulting from activity of the other processors. The powering of cache coherence and snoop circuitry necessary for responding to snoop requests resulting from the activity of other processors consumes a lot of power, and it is accordingly desirable to reduce this power consumption to a minimum when a processor enters a low-power state.

SUMMARY OF THE INVENTION

According to the invention, there is provided an apparatus for operating an integrated circuit in a reduced-power consumption state. The apparatus includes an input which is coupled to receive an access signal indicating a memory access, to a memory resource accessible by the integrated circuit, by a device external to the integrated circuit. Power-reduction logic gates a clock signal to both first and second sets of functional units within the integrated circuit, the first set of function units being required to perform cache coherency operations within the integrated circuit. The power reduction logic propagates the clock signal to the first set of functional units in response to assertion of the access signal. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for maintaining cache coherency when an integrated circuit is in a low-power state are described. In the following description, for purposes of explanation, numerous specific details are set forth in order to provide a thorough understanding of the present invention. It will be evident, however, to one skilled in the art that the present invention may be practiced without these specific details.

Computer System and Microprocessor Overview

Figure 1:
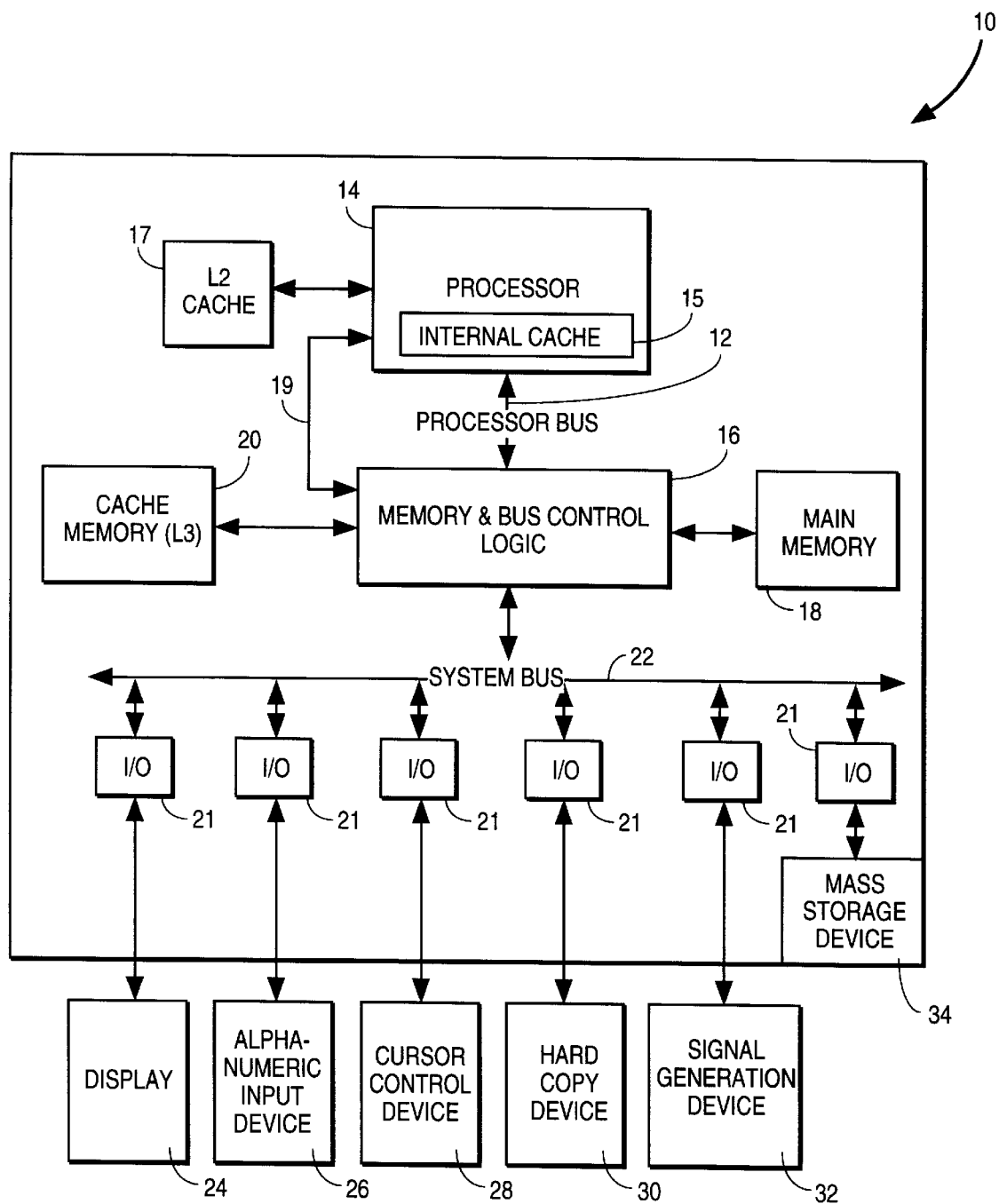
FIG. 1 is a schematic illustration of a computer system within which the present invention may be implemented.

Referring to FIG. 1, a computer system 10, which may be used in conjunction with any one of the described embodiments of the present invention, is shown in block diagram form. It will be understood that, while FIG. 1 is useful for providing an overall description of a computer system, a number of details of the system are not shown. As necessary for disclosure of the present invention, further detail is set forth with reference to the other figures provided with the specification. Further, the present invention is described with reference to exemplary embodiments. Alternative embodiments may be conceived by one with skill in the art and are considered within the scope of the invention. As illustrated in FIG. 1, the computer system 10 is a uni-processor system and comprises a processor 14, which is coupled to memory and bus control logic 16 (also termed a bus bridge) by a processor bus 12. Further processors may be coupled to the processor bus 12 to create a multi-processor system. The processor 14 is shown to include internal data and instruction caches 15, and also to have access to a Level Two (L2) cache 17 via a dedicated bus. The memory and bus logic 16 may also assert an agent bus request 19 to the processor to request control of the processor bus 12 on behalf of a peripheral device. For example, the bus request 19 may be the Priority Agent Bus Request (BPRI#) signal defined within the Intel Architecture (IA) developed by Intel Corporation of Santa Clara, Calif. The processor 14 has access to a main memory 18 via the memory and bus control logic 16. The main memory 18 typically comprises a random access memory (RAM) and store, instructions and information utilized by the processor 14. The processor 14 is also able to access a Level Three (L3) cache memory 20 via the logic 16. The memory and bus control logic 16 is coupled to a systems bus 22, via which a number of peripheral devices, coupled to the systems bus 22 by input/output (I/O) ports 21, communicate which each other, the memories 18 and 20 and the processor 14. The peripheral devices include a display unit 24 (such as a cathode ray tube (CRT) or liquid crystal display (LCD)), an alpha-numeric input device 26 (such as a keyboard), a cursor control device 28 (such as a mouse or other pointing device), a hard copy device 30 (such as a printer or plotter for providing a hard copy of a computer image), and a signal generation device 32 (such as a loud speaker). The computer system 10 also includes a mass storage device 34, which is coupled to the system bus 22.

Figure 2:
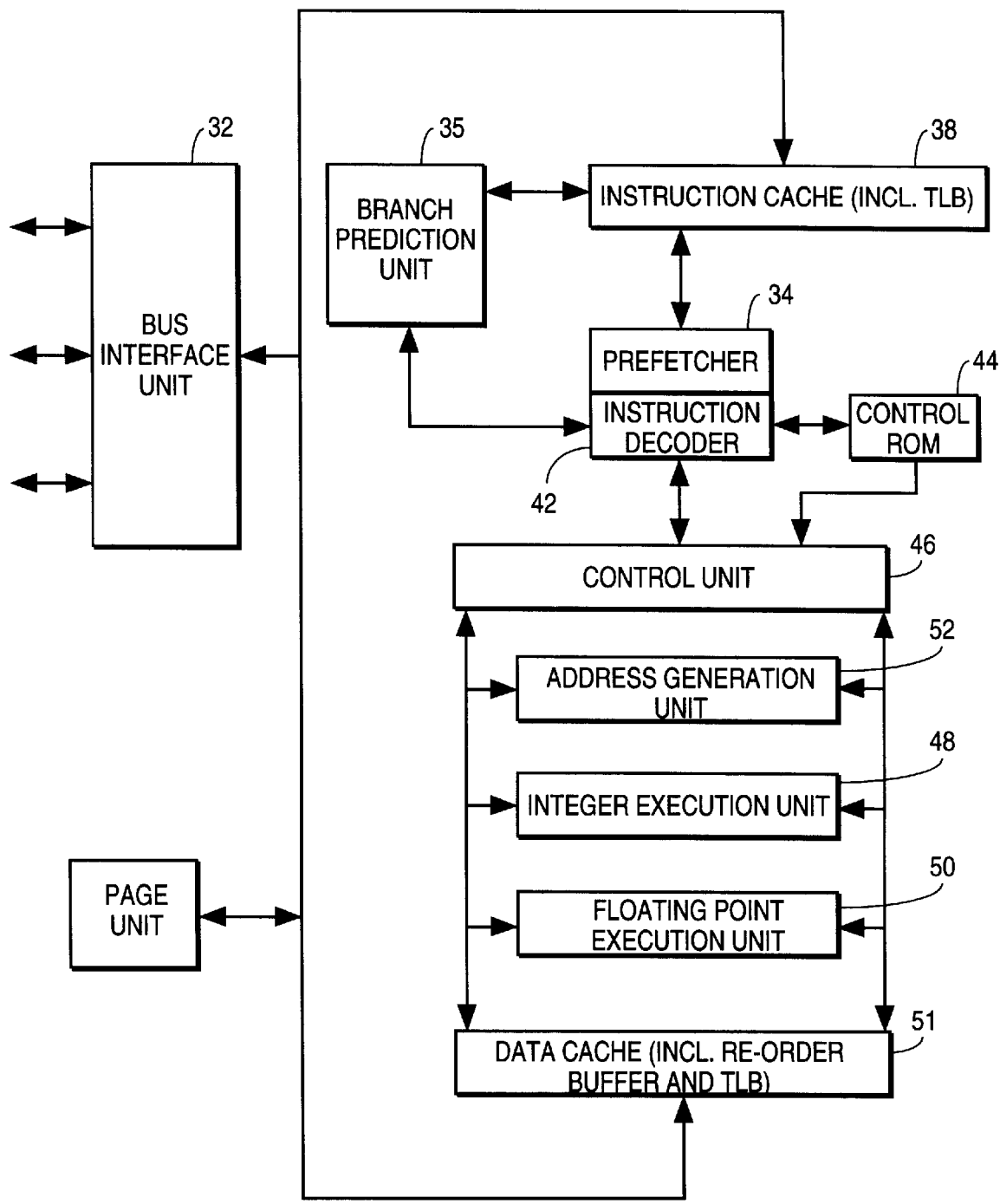
FIG. 2 is a schematic illustration of a processor within the present invention may be implemented.

Referring now to FIG. 2, a more detailed depiction of the processor 14 of FIG. 1 is shown in block diagram form. The processor 14 comprises a number of Functional Unit Blocks (FUBs), including a bus interface unit 32, which provides an interface between the processor 14 and the processor bus 12 of the computer system 10. The bus interface unit 32 includes a number of functional entities, namely write buffers, bus control logic, L2 cache control, internal cache control and address drivers and receivers. The bus interface unit 32 is coupled to allow a prefetcher 34 to access the main memory 18 of the computer system via an instruction cache 38. The prefetcher 34 fetches instructions indexed by an instruction pointer from the instruction cache 38, or alternatively from main memory 18 via the bus interface unit 32. A branch prediction unit 35 provides speculative predictions for branch instructions retrieved by the prefetcher 34, and then also outputs an instruction pointer, indexing either a sequential memory address or a target memory address, depending on whether a branch is predicted as being taken or not taken. The prefetcher 34 propagates instructions received either from the instruction cache 38, or main memory 18, to an instruction decoder 42 for decoding into a set of micro-operations ($\mu$ops) for down-stream processing. A control read only memory (ROM) 44 is coupled to the instruction decoder 42 and receives entry points from the decoder 42. The decoder 42 and the control ROM 44 supply micro-operations to a control unit 46. The control unit 46 supplies an integer pipeline execution unit 48 and a floating-point pipeline execution unit 50 with integer and floating-point instructions, respectively, for execution. The integer pipeline execution unit 48 and the floating-point pipeline execution unit 50 have access to a data cache 51 when executing the instructions. Micro-operations are also supplied from the control unit 46 to an address generation unit 52, which generates and translates address information.

Clock States

Figure 3:
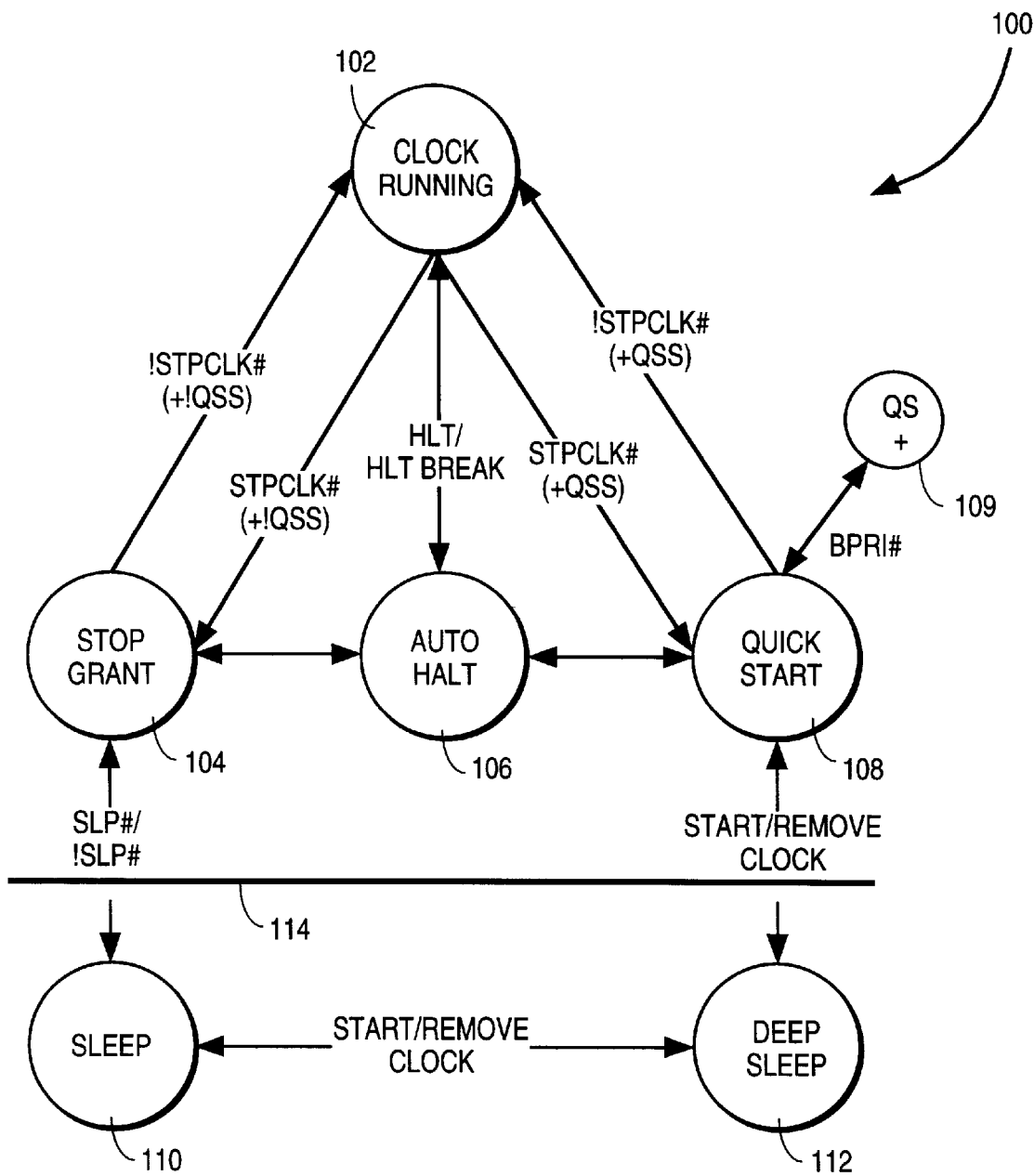
FIG. 3 is a state diagram illustrating the various clock states that may by occupied by a processor operating according to one embodiment of the present invention.

Referring to FIG. 3, there is shown a state diagram 100 illustrating the various clock states of a processor according to one embodiment of the invention. The illustrated clock states facilitate power control of a processor in both Uni-Processor (UP) mobile computer systems, and Symmetrical Multi-Processor (SMP) detktop and server computer systems. Six distinct clock states are illustrated, namely a Clock Running state 102, a Stop Grant state 104, an Auto Halt State 106, a Quick Start state 108, a Sleep state 110 and a Deep Sleep state 112. In the clock states 102 to 108, shown above the line 114, some degree of processor bus snooping for the purposes of cache coherency is facilitated, while in the states 110 and 112 below the line 114, the processor bus is not snooped. The distinction between the various clock states will now be described in further detail.

The Clock Running state 102 of a processor is the normal operating mode wherein the processor's internal clock is running, and the processor is actively executing instructions. Upon assertion of a Stop Clock (STPCLK#) signal, the processor enters either the Stop Grant state 104 or the Quick Start state 108, depending on how a "power-on strapping option" was exercised upon boot-up or reset of the processor. Specifically, a processor is configured to enter either the Stop Grant state 104 or the Quick Start state 108 at power-on by placing either a logical 0 or 1 on a strapping option line. In one embodiment, this strapping option may be exercised by driving either a 0 or 1 onto address line 15 (A15#) at reset. It will of course be appreciated that the strapping option could be exercised in any one of a number of other ways.

Assuming that the processor has been configured at power-on to enter the Stop Grant state 104 (e.g. by setting the A15# to a logical 1), upon assertion of the STPCLK# signal, the processor will then enter the Stop Grant state 104. In this state, power consumption is reduced relative to the Clock Running state 102, as many internal functional unit blocks (FUBs) of a processor are disabled. However, sufficient circuitry within a processor in the Stop Grant state 104 is kept active and clocked so as to allow the processor to respond to snoop requests and latch interrupts, as will be described in further detail below. In this way, cache coherency is maintained even when in a low-power state. A transition from the Stop Grant state 104 to the Clock Running state 102 is made upon de-assertion of the STPCLK# signal or on the occurrence of a Stop Break event, such as a processor initialization, flush or reset.

Assuming that the processor has been configured at power-on to enter the Quick Start state 108 (e.g. by setting the A15# to a logical 0), upon assertion of the STPCLK# signal, the processor will then enter the Quick Start state 108. In this state, power consumption is reduced relative to the Clock Running state 102 and relative to the Stop Grant state 104 as the majority of functional unit blocks (FUBs) of a processor are disabled, but its Phase Lock Loop (PLL) circuitry is kept functional. This deep low-power state is achieved by providing a processor with reduced response capability when in the Quick Start state 108. In one embodiment, a processor in the Quick Start state 108 is incapable of responding to latching interrupts (e.g. NMI, SMI# or INTR signals), and will also not respond to reset, initialize or flush requests. Thus, the circuitry for responding to these requests is not powered, as it is in the Stop Grant state 104, thus allowing a greater degree of power savings to be achieved in the Quick Start state 108. Should any interrupt, initialize, reset or flush requests be generated while a processor is in the Quick Start state 108, these will not be recognized, and must accordingly be held (or latched) until the STPCLK# signal is deasserted and the processor returns to the Clock Running state 102, at which time such requests will be serviced. In one embodiment of the present invention, a processor in the Quick Start state 108 is only capable of responding to snoop request, by snooping the processor bus, when an external input/output (I/O) device requests control of the processor bus. In one further embodiment, a processor in the Quick Start state 108 is capable only of responding to I/O bridge accesses that rely of the assertion of a Priority Agent Bus Request (BPRI#) signal, as defined by Intel Architecture (IA). Referring to FIG. 1, a BPRI# signal 19 is asserted by the memory and bus control logic 16 (also termed a bus bridge) to gain control of the processor (or CPU) bus 12 in response to a request by an I/O device 21. As is described in further detail below, three (3) clock cycles after the assertion of the BPRI# signal 19, the processor enters a Quick Start plus (QS+) mode 109, wherein FUBs of the processor required to accept a snoop cycle are powered and clocked. In one embodiment, the snooping behavior of a processor operating in the Quick Start plus mode 109 is such that it may only be used in a Uni-Processor (UP) configuration, as it does not snoop the processor bus for accesses other than those initiated with the BPRI# signal 19, and would according not perform a bus snoop for data operations performed by other processors employed in a multi-processor environment and coupled to the processor bus 12.

The Auto Halt state 106 is entered into on the execution of the Halt (HLT) instruction, and a return to the Clock Running state 102 is made on the occurrence of an Auto Halt Break event. In a processor conforming to Intel Architecture specifications, an Auto Halt Break event may occur when an NMI, INTR, BINT#, FLUSH# or SMI# signal goes active, or a probe mode request is made.

A processor according to the invention may also operate in the Sleep and Deep States 110 and 112. The Sleep state 110 is entered into from the Stop Grant state 104, and this transition occurs on assertion of a Sleep (SLP#) signal. In the Sleep state 110, a processor maintains its context, has shut-off all internal clocks, but retains its Phase Lock Loop (PLL) circuitry active, thus allowing the processor to exit the Sleep state 110 with minimal latency. As all internal clocks are stopped, a processor in the Sleep state 110 is incapable of snooping, latching any interrupt signals or being reset.

By powering down the PLL circuitry of a processor, the Deep Sleep state 112 is entered. This is achieved by stopping the input clock frequency to the processor.

Clock Circuitry

Figure 4:
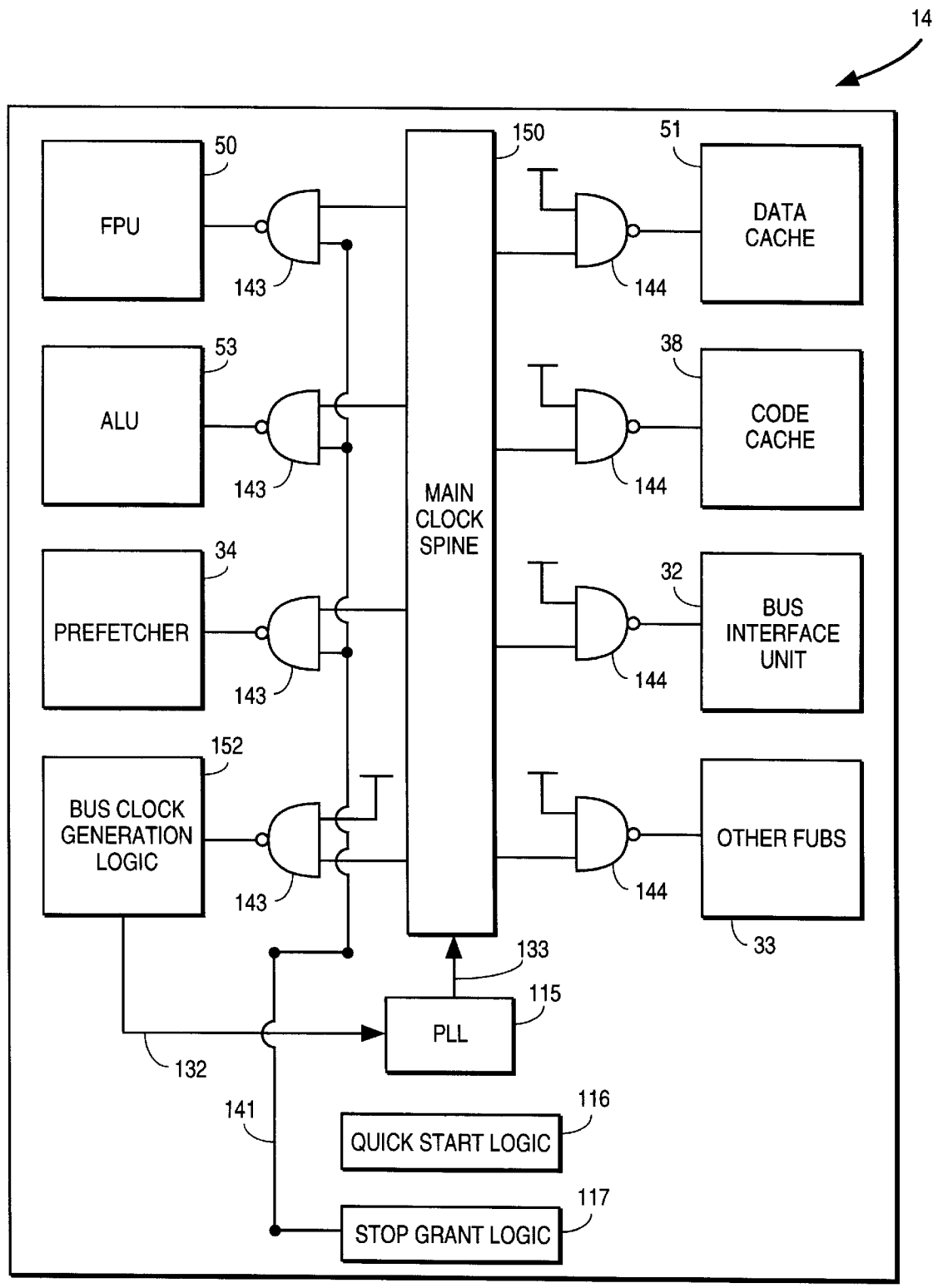
FIG. 4 is a schematic illustration of the processor of FIG. 2, configured to operate in a Stop Grant mode, according to the invention.
Figure 5:
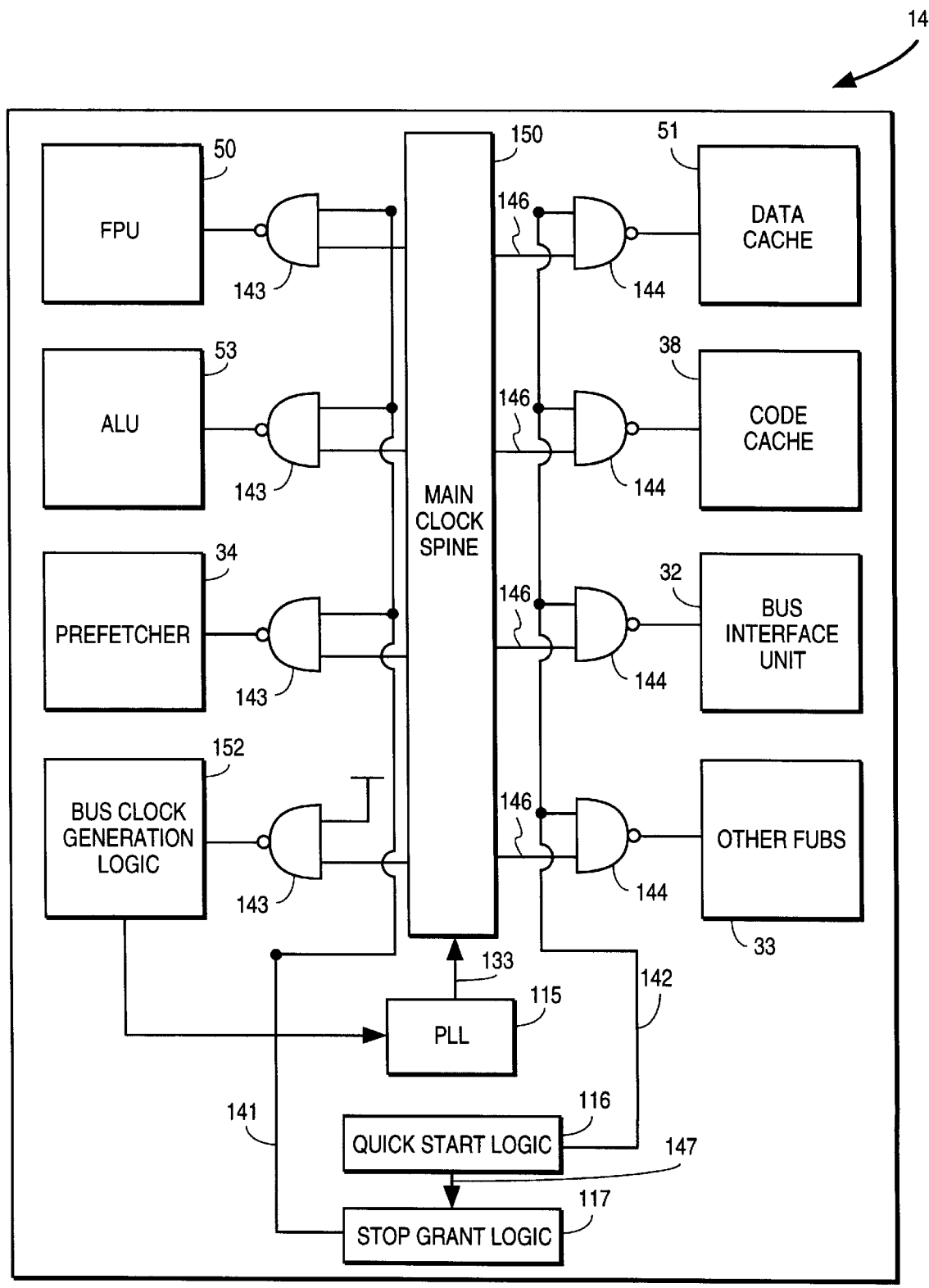
FIG. 5 is the processor of FIG. 2, configured to operate in a Quick Start mode, according to the invention.

FIGS. 4 and 5 are schematic illustrations of the processor 14, and show various Functional Unit Blocks (FUBs), clock control circuitry, and other associated circuitry which operate according to the teachings of the present invention. FIG. 4 shows the processor 14 configured for operation in the Stop Grant mode 104, while FIG. 5 shows the processor 14 configured for operation in the Quick Start mode 108. The processor 14 shown in both FIGS. 4 and 5 comprises a number of FUBs, namely a Floating Point Unit (FPU) 50, and Arithmatic Logic Unit (ALU) 53, a prefetcher 34, bus clock generation logic 152, a data cache 51, a code cache 38, and a bus interface unit 32. The processor 14 contains a number of other FUBs, which are represented by block 33. It will be appreciated that the above FUBs are merely exemplary, and not intended to provide an exhaustive or required list of FUBs. The FUBs shown on the right hand side of the processor 14 (i.e., FUBs 51, 38, 32 and 33) are characterized in that they are required to be operational for the performance of internal and external snooping operations. In contrast, the FUBs 50, 53 and 34 on the left hand side of the processor 14 are not required to be functional during a snooping operation.

Each of the FUBs is coupled to receive a clock signal from a main clock spine 150 via a NAND gate 143 or 144. The bus clock generation logic 152 furthermore provides a feedback bus clock signal 132 to Phase Lock Logic (PLL) 115, which in turn provides a locked core clock signal 133 to the clock spine 150. The processor 14 also includes Quick Start logic 116 and Stop Grant logic 117. Referring to FIG. 4, the processor 14 is shown to be configured for operation in the Stop Grant mode 104. The Stop Grant logic 117 is able selectively to power down the FUBs 50, 53 and 34 by disabling the supply of clock signals from the clock spine 150 to these FUBS. Specifically, by the deassertion and assertion of a Global Stop Clock Enable (GSCLK_ENA) signal 141, the Stop Grant logic 117 can operate the NAND gates 143 associated with the FUBs 50, 53 and 34 to gate or block the supply of a clock signal from the clock spine 150 to these FUBS. Accordingly, to place the processor 14 in the Stop Grant mode 104, the Stop Grant logic 117 deasserts the GNSCLK_ENA signal 141, thus preventing any switching activity from occurring in the FUBs 50, 53 and 34. It is important to note that, in the Stop Grant mode 104, the FUBs 51, 38, 32 and 33 required for cache coherency are not disabled, and are still clocked with clock signals supplied from the clock spine 150. Accordingly, these FUBs are able to initiate both internal and external snooping operations in a conventional manner, and thus maintain cache coherency even when the processor 14 is in the low-sower Stop Grant mode 104. It will further be noted that the supply of a clock signal to the bus clock generation logic 152 is not gated. Accordinly the feedback signal 132 will continue to be supplied to the PLL 115, which will then remain in a locked state.

This is in contrast with the Deep Sleep mode 112, in which the PLL 115 and the bus clock generation logic 152 are powered down, thus terminating the supply of the core clock signal 133 to the clock spine 150. In view of the fact that the circuitries 152 and 115 are powered down, and that the clock spine 150 no longer carries a clock signal, the only power consumption by the processor in the Deep Sleep mode 112 is due to leakage. However, to again provide a reliable clock signal on the clock spine 150, the PLL 115 must again be powered, and allowed to lock, which in turn results in a heavy access latency of up to 1 ms.

Referring now to FIG. 5, one embodiment of a processor 14 configured for operation in the Quick Start mode 108 is shown. Specifically the NAND gates 144, through which a Global Non-Stop Clock (GNSCLK) signal 146 is supplied to the FUBs 51, 38, 32 and 33, are selectively enabled and disabled by the Quick Start logic 116 through the assertion and deassertion of the Global Non-Stop Enable (GNSCLK_EN) signal 142. The Quick Start logic 116 also propagates a signal 147 to the Stop Grant logic 117, which deasserts the signal 141 to thereby gate the supply of a clock signal to the FUBs 50, 53 and 34. Accordingly, upon entry into the Quick Start mode 108, the Quick Start logic 116 itself disables the FUBs 51, 38, 32 and 33 and propagates a signal to the Stop Grant logic 117, which causes the logic 117 to disable the FUBs 50, 53 and 34. As will be described in further detail below, upon the assertion of a predetermined access signal indicating a memory access from a peripheral unit within a computer system (e.g. BPRI# signal), the Quick Start logic 116 places the processor 14 in Quick Start plus mode 109 by asserting the GNSCLK_EN signal 142, to thereby renewable the supply of the clock signal 146 to the data cache 51, the code cache 38, the bus interface unit 32 and other FUBs 33. However, the signal 147 to the stop grant logic 117 remains unchanged, thus causing the FUBs 50, 53 and 34 to remain in a power down state. In the Quick Start plus mode 109, the FUBs 51, 38, 32 and 33, which are required for cache coherency, are thus operational and able to respond to a snoop request. Thus, only the FUBs required for responding to a snoop request are powered up in the Quick Start plus mode 109, while the remaining powered down circuitry is left in that state. On completion of the snooping operation the processor 14 is entered back into the Quick Start mode 108 by the Quick Start logic 116, which then deasserts the signal 142.

In summary, when operating in the Stop Grant mode 104, the processor 14 is able to perform cache coherency operations in response to a first set of signals (e.g., snoop interact, initialize and reset signals, etc.), whereas in the Quick Start mode 108, the processor responds only to a signal indicating an memory access request by an external peripheral device (e.g., BPRI# signal). The processor 14, when in the above modes, responds to the relevant signals to maintain cache coherency by, for example, invalidating a cache line in a cache memory resource associated with the processor 14.

Figure 6:
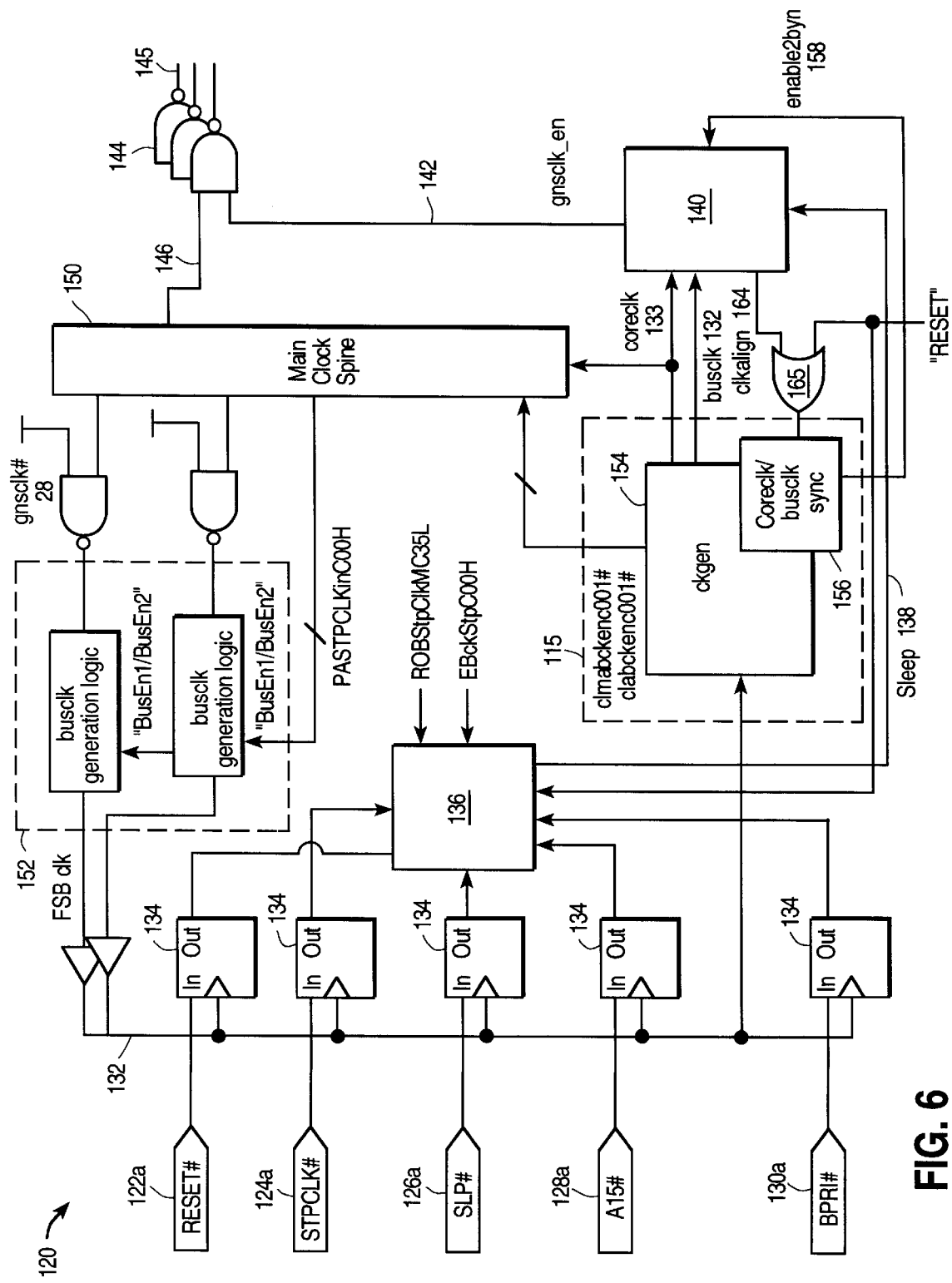
FIG. 6 is a schematic illustration of clock circuitry for operating an integrated circuit in a reduced-power consumption state according to the present invention.

FIG. 6 provides a more detailed view of the clock spine 150, the bus clock generation logic 152, the PLL 115 and the Quick Start logic 116. Specifically, FIG. 6 shows clock control circuitry 112 that is coupled to receive a Reset (RESET) signal 122 via a pin 122A, the Stop Clock (STPCLK#) signal 124 via a pin 124A, the Sleep (SLP#) signal 126 via a pin 126A, a configuration (or strapping option) signal 128 via an address (A15#) pin 128A, and a Priority Agent Bus Request (BPRI#) signal 130 via pin 130A. Each of the signals applied to the pins 122A–130A is latched in response to a Front Side Bus (FSB) clock signal 132 by an appropriate latch 134, and presented to sleep/start state logic 136, which is illustrated in greater detail in FIG. 5. The sleep/start state logic L36 in combination with clock enable/disable logic 140 comprises the Quick Start logic 116, shown in FIGS. 4 and 5. In response to the various inputs received from the latches 134, the sleep/start state logic 136 outputs a sleep signal 138 to the clock enable/disable logic 140. The clock ernable/disable logic 140, responsive to the state of the sleep signal 138, generates the Global Non-Stop Clock Enable (GNSCLK_EN) signal 142, which is propagated to the NAND gates 144. The NAND gates 144 are each coupled to receive the GNSCLK_EN signal 142 and the GNSCLK signal 146 as inputs. The outputs of the NAND gates 144 comprise a clock signal 145 (GNSCLK) which is propagated to the FUBs required during a snoop operation to maintain cache coherency. Thus, the assertion and deassertion of the GNSCLK_EN signal 142 causes the clock signal to the FUBs 51, 38, 32 and 33 of the processor 14 to be enabled and disabled respectively.

The clock control circuitry 120 also includes the main clock spine 150, the bus clock generation logic 152, and the PLL 115. The main clock spine 150 is responsible for the distribution of a core clock signal within the processor, while the bus clock generation logic 152, the core clock generation logic 154, and the PLL 115 are responsible for the generation of the bus clock and core clock signals 132 and 133 respectively. The core clock signal 133 is synchronized to the bus clock signal 132, which is fed back to the core clock generation logic 154, and may be either a whole-multiple (e.g. ×2 or ×3) of the bus clock signal 132, or a half-multiple (e.g. ×2.5 or ×3.5) of the bus clock signal 132.

The core clock generation logic 154 also include, core clock/bus clock synchronization circuitry 156 for maintaining synchroneity between these clock signals. The circuitry 156 outputs an ENABLE2BYN signal 158 to the clock enable/disable logic 140, which indicates whether the bus clock multiplier is an integer or not. The clock enable/disable logic 140 provides a Clock Align (CLKALIGN) signal 164 to the synchronization circuitry 156 through an OR gate 165. Depending on the state of the ENABLE2BYN signal 158, the clock enable/disable logic 160 asserts the CLKALIGN signal 164 at the appropriate time. Upon reset, or upon assertion of the CLKALIGN signal 164, the core clock generation circuitry 154 forces the phase of the core clock signal 133 (CORECLK) to shift so as to create falling edge synchronization between the bus and core clocks. The core clock generation logic 154 is coupled to receive the bus clock signal 132 as feedback. By comparing the phase of the bus clock signal 132 with the core clock signal 133, the synchronization circuitry 156 provides the ENABLE2BYN signal 158 as feedback to the clock enable/disable logic 140.

Returning now to the input signals, the RESET# signal 122 is propagated to the sleep/start state logic 136 via the pin 122A, causing the clock control circuitry 120 to reset, while assertion of the SLP# signal 126 will cause the clock control circuitry 120 to place a processor in the Sleep State 110 by assertion of the sleep signal 138. Further details of the RESET# and SLP# signals are not pertinent to an understanding of the present invention.

The configuration signal 128 applied to the A15# pin 128A at power-up (also termed "reset" or "boot-up") determines whether the sleep/start state logic 136 causes a processor to be placed in the Stop Grant state 104 or the Quick Start state 108 when the STPCLK# signal is asserted on pin 126A. Specifically, if a logical 1 is applied to pin 128A at power-up, the sleep/start state logic 136 is configured to place a processor in the Stop Grant state 104 on assertion of the STPCLK# signal 124, while if a logical 0 is applied to the pin 128A at power-up, the sleep/start state logic 136 is configured to place a processor in the Quick Start state 108 on assertion of the STPCLK# signal 124.

When in the Stop Grant state 104, the FUBs of the processor required for responding to a snoop request are active and clocked, and thus able to perform a cache coherency operation when required.

When in the Quick Start state 108, the sleep/start state logic 136 monitors pin 130A for assertion of the BPRI# signal 130. In response to the assertion of the BPRI# signal, the sleep/start states logic 136 deasserts the sleep signal 138, so as to allow the processor to perform a snoop of the processor bus 12.

Figure 7:
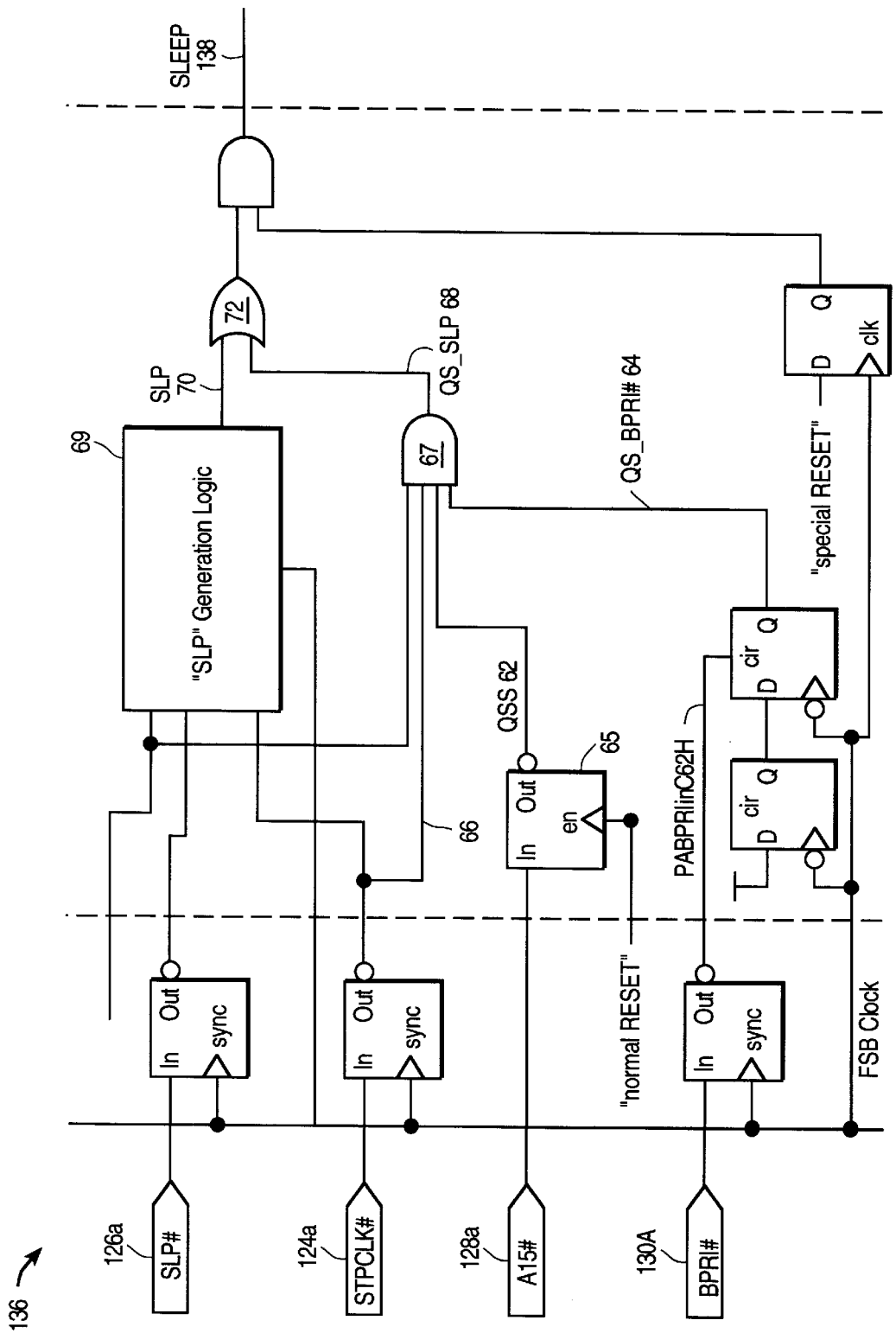
FIG. 7 is a schematic illustration showing further detail regarding start/stop logic incorporated within the clock circuitry of FIG. 6.

Referring to FIG. 7, a more detailed view of the sleep/start state logic 136 is provided. The logic 136 comprises sleep generation logic 69, which outputs a SLP signal 70 in response to an assertion of either the SLP# signal 126 or the STPCLK# signal 124. Of importance in the Quick Start mode 108 is the latch 65, which latches the configuration signal 128 applied to the address pin 128A upon boot-up of the computer system. If a logical zero of (0) is applied to the pin 128A on boot-up, the latch 65 is configured to output a logical one (1) QSS signal 62 to a 4-input AND gate 67. The AND gate 67 is also coupled to receive the inverse of the STPCLK# signal 124 and the inverse of the BPRI# signal 130. Accordingly, when the STPCLK# signal 124 is asserted, and the QSS signal 62 is high (on account of the configuration signal 128 having configured the latch 65), an assertion of the BPRI# signal 130 will cause the output of the AND gate 67 to go high, and accordingly cause the sleep signal 138 to be asserted through the OR gate 72. As detailed above, the assertion of the sleep signal 138 causes the clock enable/disable logic 140 to assert the GNSCLK_EN signal 142 when appropriate.

Figure 8:
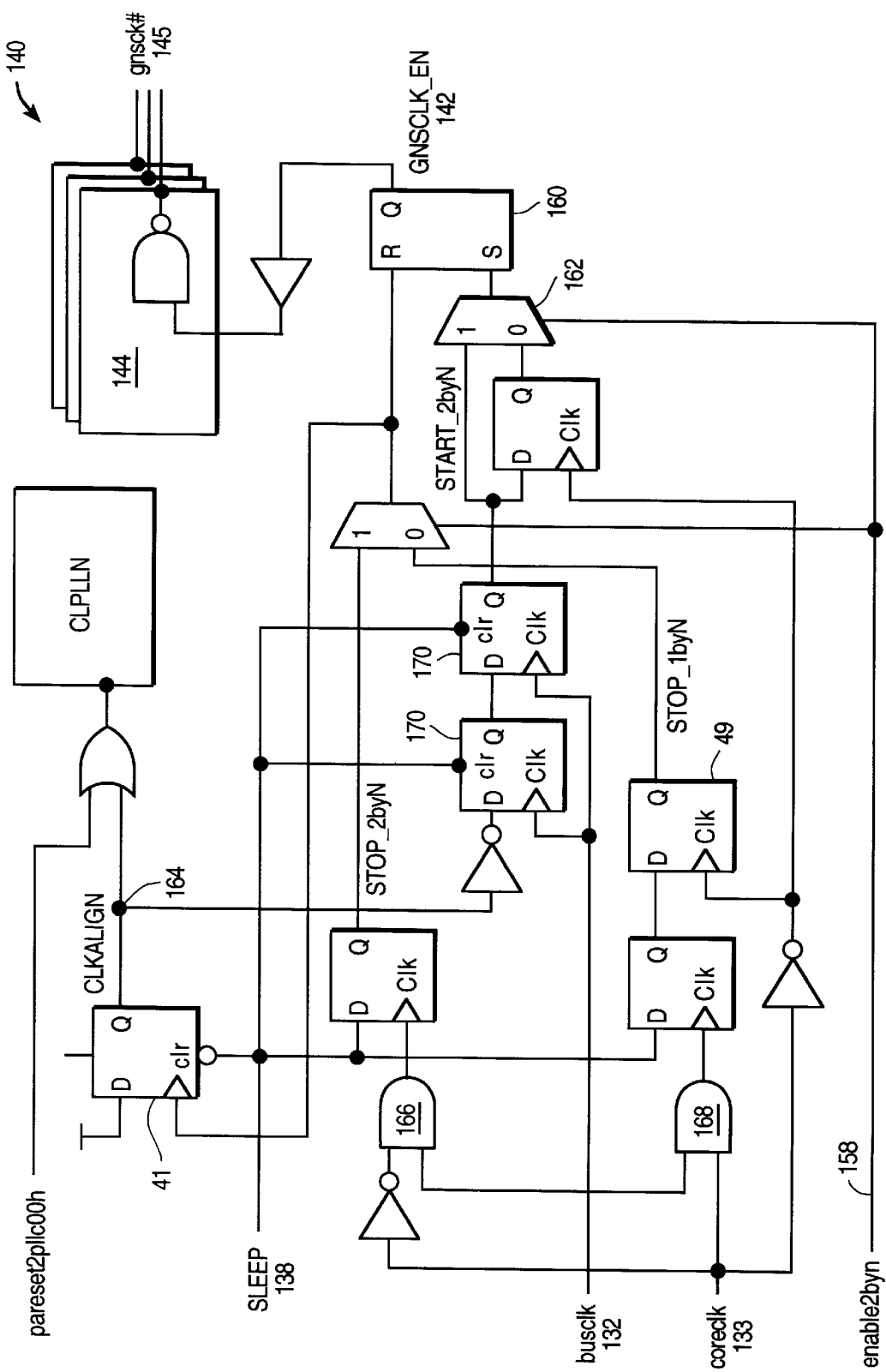
FIG. 8 is a schematic illustration providing further detail regarding the structure of clock enable/disable logic incorporated within the clock circuitry shown in FIG. 6.

FIG. 8 shows further detail of one embodiment of the clock enable/disable logic 140. The primary function of the clock enable/disable logic 140 is to ensure that the GNSCLK_EN signal 142 is asserted or deasserted with the desired timing. The logic 140 is coupled to receive the sleep signal 138, which during the Clock Running state 102 is deasserted (low state). The Clock Align (CLKALIGN) signal 164 is similarly deasserted in the Clock Running State 102. The GNSCLK_EN signal 142 is asserted through a SET input of an R/S latch 160, whose RESET input is deasserted. The ENABLE2BYN signal 158 operates a multiplexer 162 to select one of two paths to drive clock stop/restart events on alignment of the bus and core clocks for either a 2/N (non-integer) or 1/N (integer) mode of operation. A GNSCLK# signal 145 propagated from the NAND gates 144, is always stopped or restarted (by deassertion or assertion of the GNSCLK_EN signal 112 to the NAND gates 144) when the core clock (CORECLK) signal is low, in order to avoid glitching or a sub-minimum pulse width. In order to meet this requirement, in the 2/N mode, the assertion or deassertion of GNSCLK_EN signal 142 occurs on a misaligned boundary, so that the core clock (CORECLK) signal 133 is in low state. When in the 2/N mode, a clock pulse of the CORECLK is "swallowed" to allow for clock alignment between the core clock (CORECLK) and the bus clock (BUSCLK). In the 1/N mode, the bus clock (BUSCLK) and core clock (CORECLK) signals are always aligned, so GNSCLK# stop or restart is delayed to the CORECLK low phase immediately following the aligned boundary. Thus, when operating in the 1/N mode, the R/S latch 160 is RESET via an AND gate 166 one processor clock cycle after the sleep signal 138 is deasserted, and then SET by D-flip-flops 170 two processor cycles after the sleep signal is deasserted.

Timing Diagram

Figure 9A:
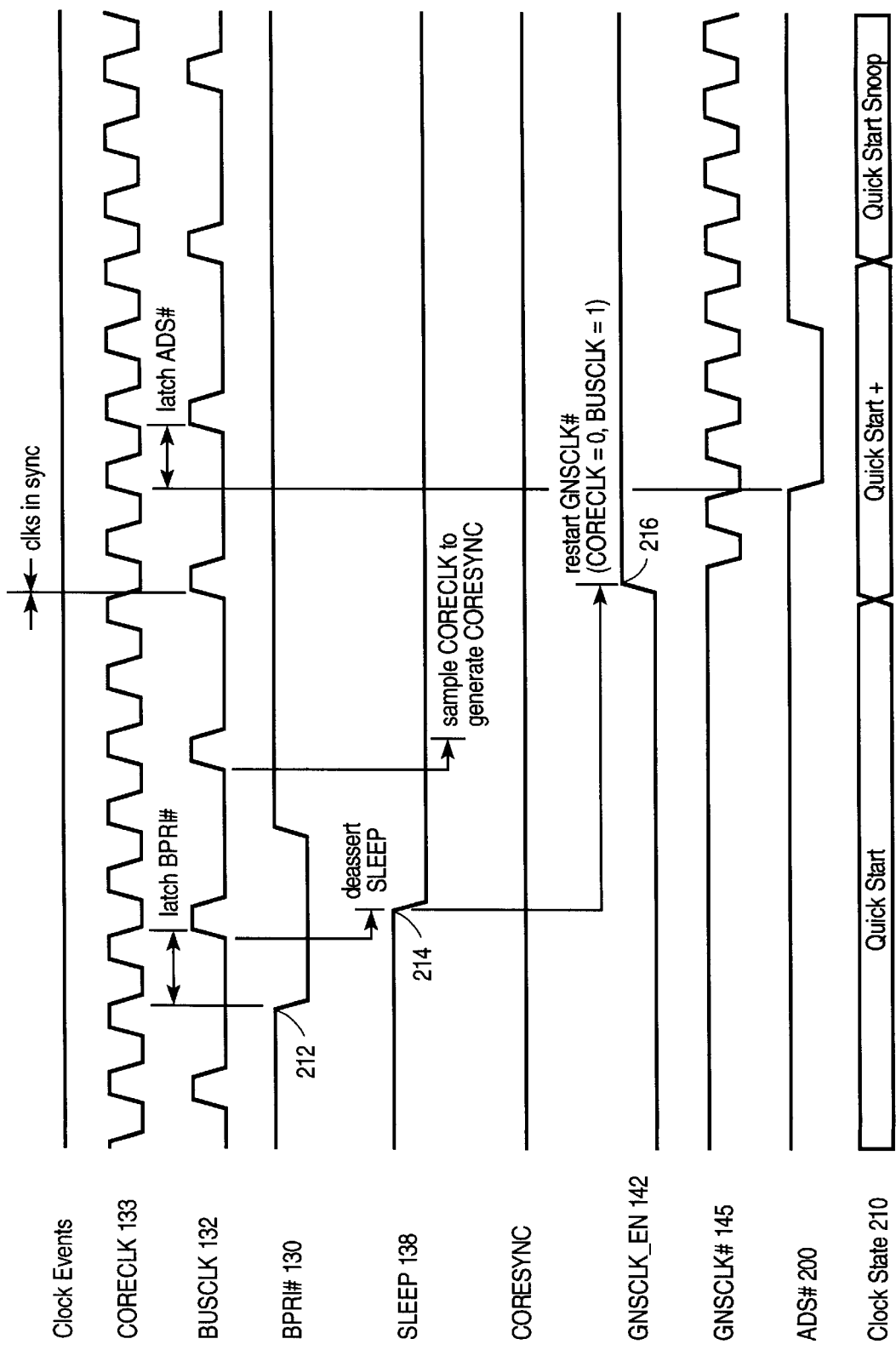
FIGS. 9A and 9B are timing diagrams showing the timing of various signals described with reference to FIGS. 4–8.
Figure 9B:
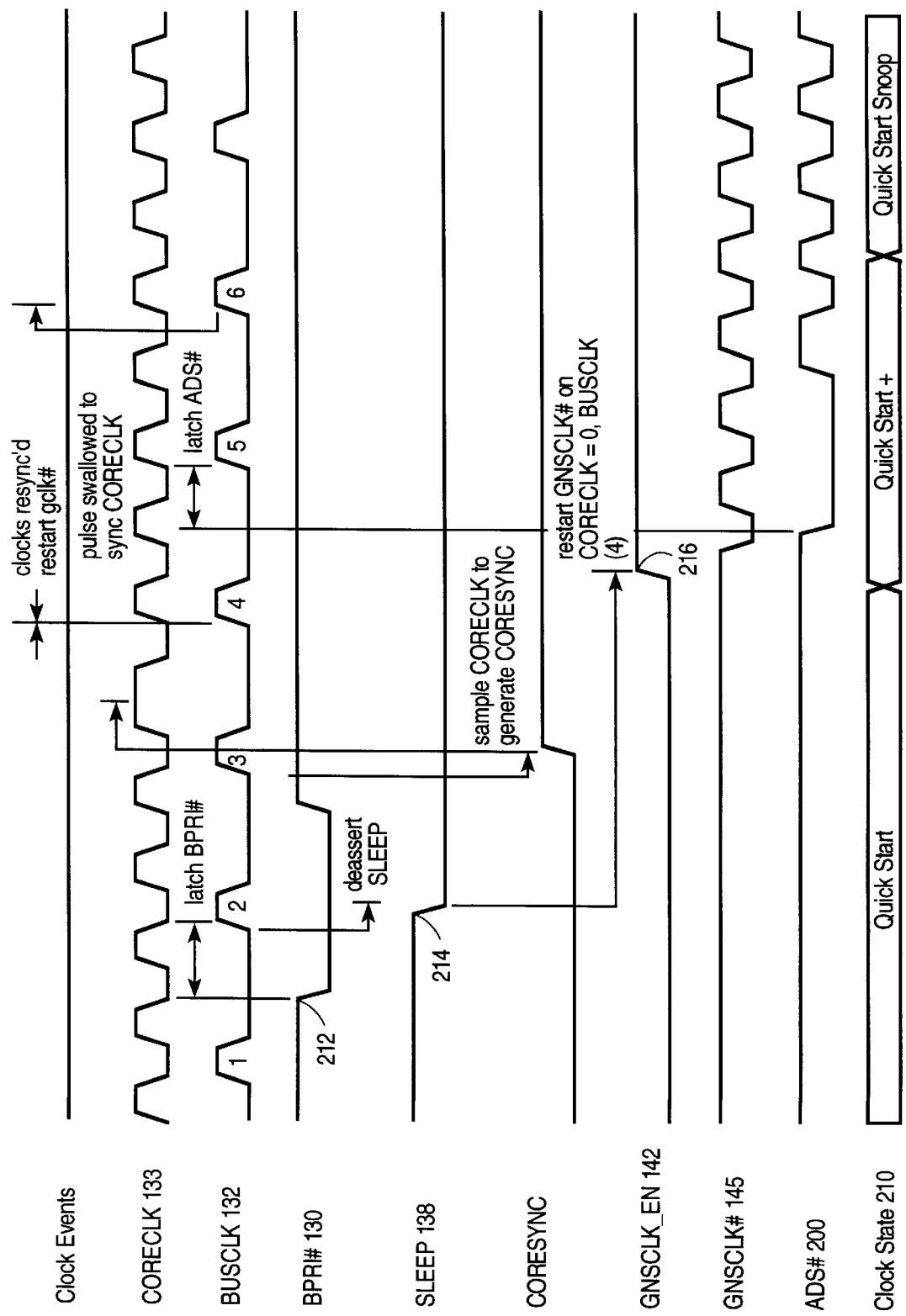

FIGS. 9A and 9B are timing diagrams, showing the timing the various signals described above with reference to FIGS. 4–8. FIG. 9A illustrates the relative timing, in the non-integer (2/N) mode, of the CORECLK signal 133, the BUSCLK signal 132, the BPRI# signal 130, the SLEEP signal 138, the GNSCLK_EN signal 142, the GNSCLK# signal 145, and an Address Status (ADSS)# signal 200. The clock state is also illustrated at 210. FIG. 9B illustrates the relative timing of the same signals in the integer (1/N) mode. Each timing diagram commences with a processor in the Quick Start state 108, in which the GNSCLK# signal 145 is disabled. In the Quick Start state 108, the sleep/start state logic 136 continually monitors for the assertion of the BPRI# signal 130 as described above. Once the sleep/start state logic 136 detects assertion of the BPRI# signal 130 at points 212, the SLEEP signal 138 is deasserted at the next rising edge of the BUSCLK signal 132, as shown at points 214. In response to the deassertion of the SLEEP signal 138, the clock enable logic 140 asserts the GNSCLK_EN signal 142 after a delay which is dependent upon, and determined by, whether the clock circuitry is operating in the 2/N or the 1/N mode, as shown at points 216 and as described above. The GNSCLK_EN signal 142 is asserted at a time when the CORECLK signal 133 is low. In response to the assertion of the GNSCLK_EN signal 142, the NAND gates 144 then output the GNSCLK 145 to the FUBs required to service a snoop request, and the processor enters the "Quick Start plus" mode 109.

Specifically, the GNSCLK signal 145 is restarted in time to allow the address (which is valid on assertion of the ADS# signal 200) of the memory access to be snooped. The processor then enters a "Quick Start Snoop" state, wherein the snoop request is processed.

Flowcharts

Figure 10:
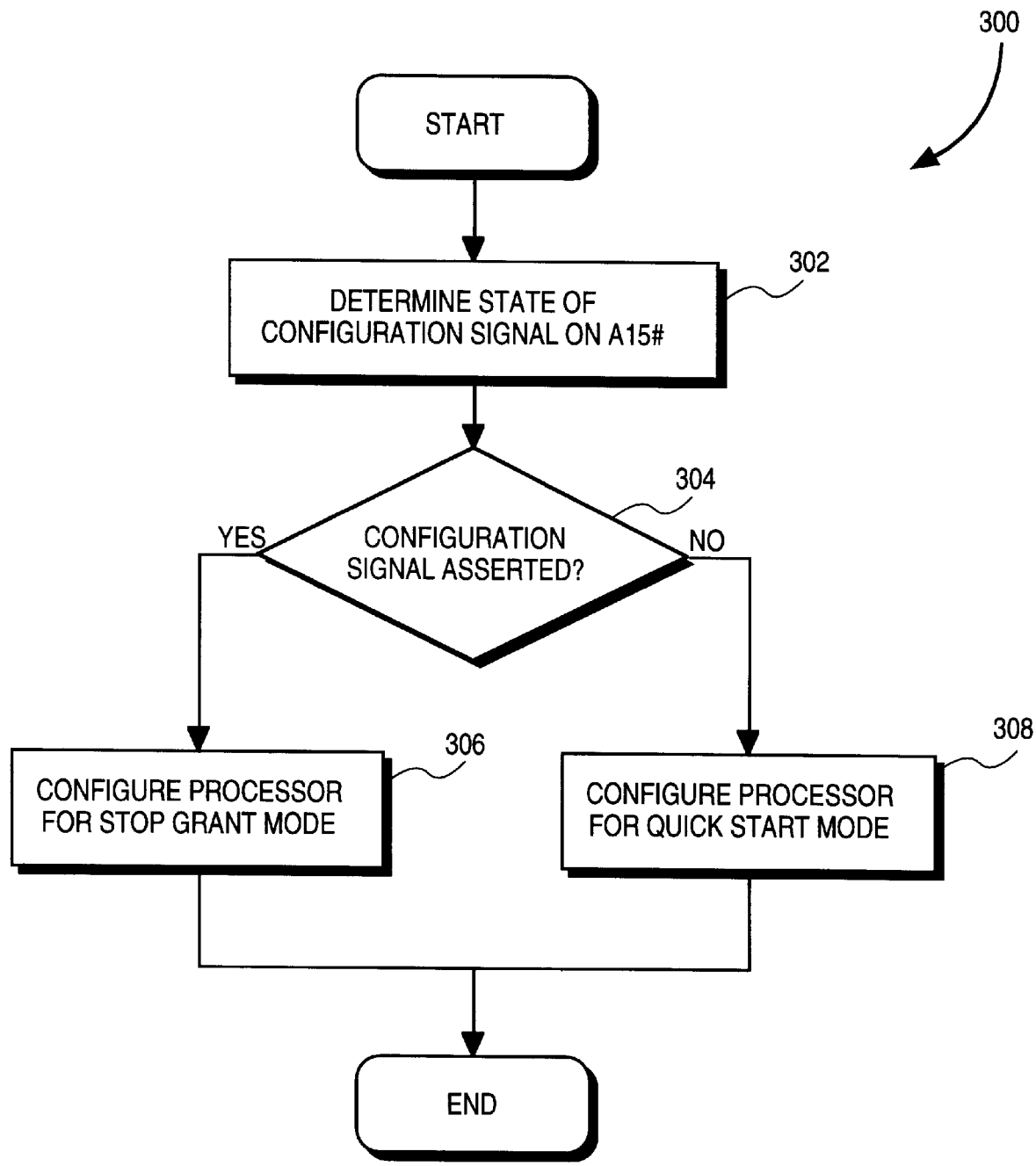
FIG. 10 is a flow chart illustrating one embodiment of a method, according to the present invention, of configuring a processor to maintain cache coherency when in a reduced-power consumption state.

FIG. 10 is a flowchart illustrating one embodiment of a method 300, according to the present invention, of configuring a processor to maintain cache coherency when in a low-power state. At power-up, a determination is made at step 302 as to the state of a configuration (or strapping) signal 128 applied to the A15# pin 128A of the processor. Having determined the state of the configuration signal 128, the method 300 proceeds to decision box 304, where the method 300 is directed to step 306 if the configuration signal is a logical 1 and to step 308 if the configuration signal is a logical 0. At step 306, the processor is configured to enter the Quick Start state 108 if the STPCLK# signal 124 is asserted, and to thus be responsive to a first set of signals only for the purpose of maintaining cache coherency. In one embodiment, the first set of signals comprises only the BPRI# signal 130. Alternatively, at step 308, the processor is configured to enter the Stop Grant state 104 on assertion of the STPCLK# signal 124, and to thus be responsive to a second set of signals which in one embodiment includes the ADS# signal.

Figure 11:
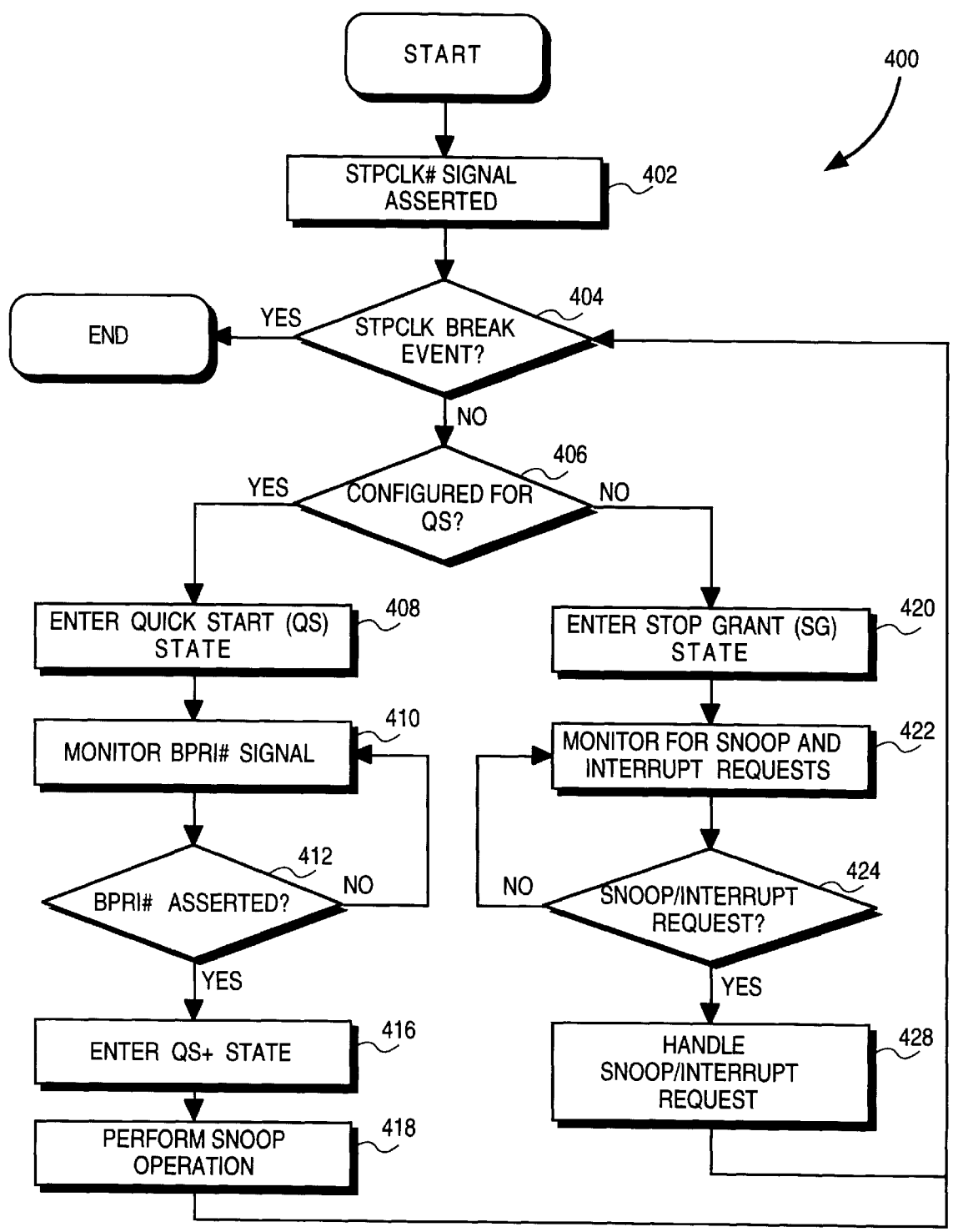
FIG. 11 is a flow chart illustrating a method, according to the invention, of entering a reduced-power consumption state within a processor.

FIG. 11 is a flowchart illustrating a method 400 of entering a low-power mode within a processor. The method 400 commences at step 402 with the assertion of the STPCLK# signal 124. The method 400 proceeds to decision box 404 to detect whether a subsequent STPCLK break event has occurred. If so, method 400 exits. Otherwise, method 400 moves on to decision box 406, where a determination is made as to whether the processor is configured to enter the Quick Start state 108 This is dependent on the configuration signal 128 applied to A15# pin 128A at power-up of the processor. If the processor has been configured to enter the Quick Start mode 108, this mode is entered at step 408, whereafter the BPRI# signal 130 is monitored at step 410. At decision box 412, it is determined whether the BPRI# signal 130 has been asserted. If not, step 410 is revisited, and the method 400 continues to cycle through steps 410 and 412 until the BPRI# signal 130 is asserted or a STPCLK break event occurs. If the BPRI# signal 130 is asserted, the processor enters the Quick Start+ state at step 416, whereafter a snoop operation of the processor bus is performed at step 418. Thereafter, a method 400 returns to decision box 404.

Alternatively, if it is determined at decision bow 406 that the processor is not configured to enter the Quick Start state 108, the processor enters the Stop Grant state 104 at step 420. Thereafter the processor monitors for any snoop or interrupt requests at step 422. If no such requests are detected, step 422 is revisited, and the method 400 continues to cycle through steps 422 and 424 until a snoop or interrupt request is received or until a STPCLK break event occurs. On the occurrence of a snoop of interrupt request, this request is handled at step 428, whereafter the method 400 returns to decision box 404.

Figure 12:
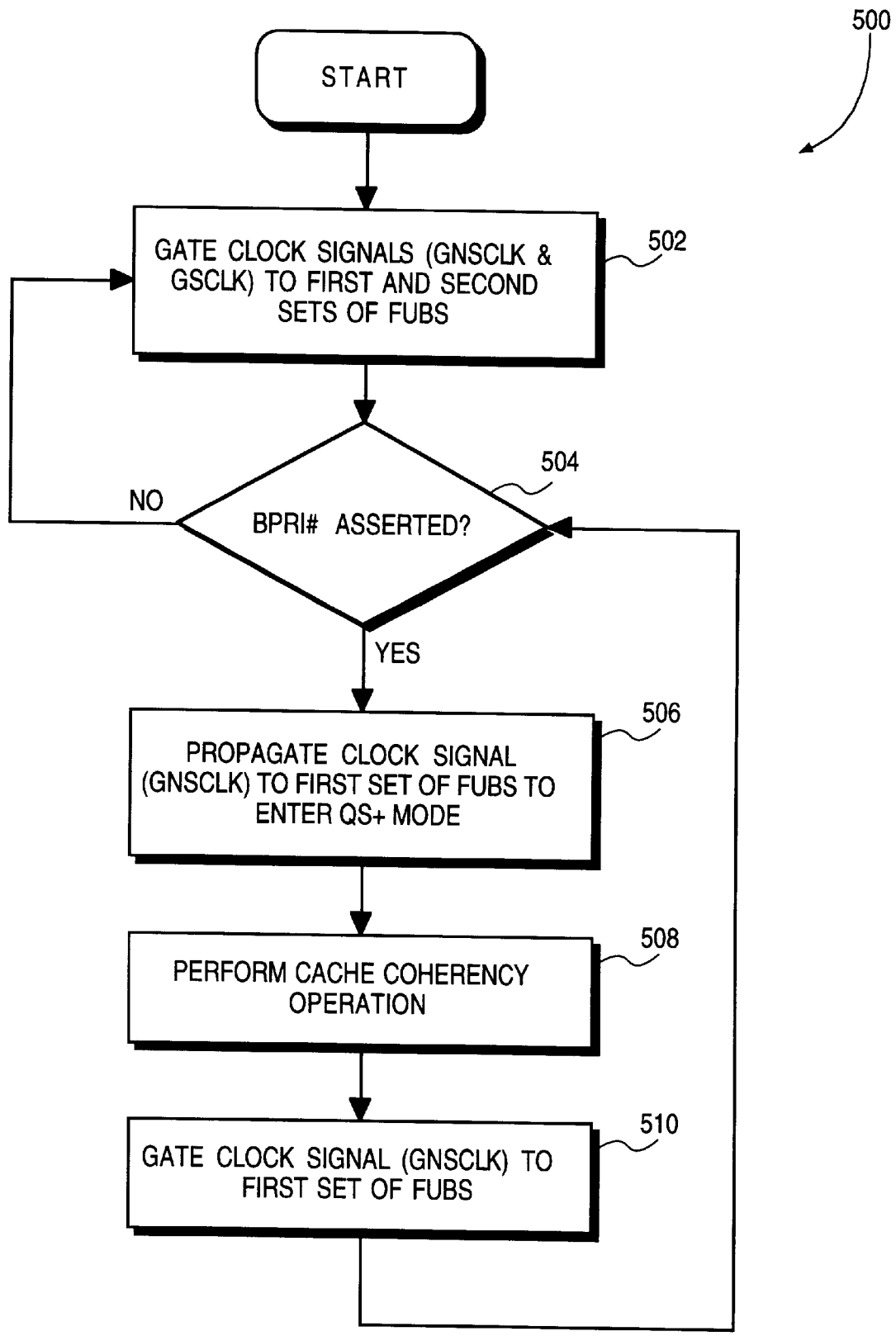
FIG. 12 is a flow chart illustrating a method, according to the present invention, of operating an integrated circuit in a reduced-power consumption state.

FIG. 12 is flow chart illustrating a method 500, according to the invention, of operating an integrated circuit in a reduced-power consumption state. Specifically, the method 500 illustrates the operation of the processor 14 operating in the Quick Start mode 108. The processor enters the Quick Start mode and then proceeds to step 502, wherein clock signals, namely the GNSCLK and GSCLK clocks, are gated, and thus prevented from being propagated to first and second sets of FUBs. The first and second sets of FUBs are distinguished in that the first set of FUBs is required to perform a cache coherency operation within the processor (e.g., the data cache 51, the code cache 38 and the bus interface unit 32), whereas the second set of FUBs performs an instruction processing function (e.g. the floating point execution unit 50, the integer execution unit 48, and the prefetcher 34). Accordingly, no switching events occur within either of the first or second sets of FUBs. The method then proceeds to decision box 504 where a determination is made as to whether a signal indicating a memory access by a device, external to the integrated circuit, is detected. In one embodiment, such a signal comprises the BPRI# signal defined by the Intel Architecture. Should this signal not be asserted, the method 500 returns to step 502. On the other hand, should this signal in fact be asserted, the method proceeds to step 506, where the GNSCLK clock signal is again enabled and propagated to the first set of FUBs, thus causing the first set of FUBs to again be operational. At step 508, the first set of FUBs performs a cache coherency operation in response to the memory access by the external device, whereafter the GNSCLK clock signal is again gated to the first set of FUBs, at step 510, thus again returning the first set of FUBs to a reduced-power consumption state. The methodology then returns to decision box 504.

Thus, a method and apparatus for maintaining cache coherency when an integrated circuit is in a low power state have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. Apparatus for operating an integrated circuit in a full-power state and in first and second reduced power states, the integrated circuit including a first set of functional units required to perform a cache coherency operation and a second set of functional units not required to perform the cache coherency operation, the apparatus comprising:

a first input to receive a configuration signal, the configuration signal indicating whether the integrated circuit transitions from the full-power state to the first or to the second reduced power state a second input to receive a power-down signal, the power-down signal transitioning the integrated circuit from the full-power state to either the first or to the second reduced power state in accordance with the configuration signal;

a third input to receive an access signal indicating a memory access, to a memory resource accessible by the integrated circuit, by a device external to the integrated circuit; and power-reduction logic to transition the integrated circuit from the full-power state to the first or to the second reduced power state in accordance with the configuration signal and responsive to the power-down signal, and to enable the integrated circuit to perform a cache coherency operation in both the first and second reduced power states by:

(1) when in the first reduced power state, continually propagating a clock signal to the first set of functional units, within the integrated circuit, required to perform a cache coherency operation; and (2) when in the second reduced power state, gating a clock signal to both the first and the second sets of functional units within the integrated circuit and to propagate the clock signal to the first set of functional units, but not the second set of functional units, in response to the access signal.

2. The apparatus of claim 1 wherein the power-reduction logic, when the integrated circuit is in the second reduced powers, gates the clock signal to the first set of functional units on completion of a cache coherency operation performed by the first set of functional units.

3. The apparatus of claim 1 wherein the first set of functional units includes a bus interface unit.

4. An integrated circuit operable in a full-power consumption mode and in first and second reduced power consumption modes, the integrated circuit comprising:

a configuration input to receive a configuration signal, the configuration signal indicating whether the integrated circuit transitions from the full-power consumption mode to either the first or the second reduced power consumption mode;

cache coherency circuitry to maintain coherency between a main memory and a cache memory accessible by the integrated circuit;

instruction processing circuitry to process instructions within the integrated circuit; and power-reduction circuitry to:

(1) disable a clock signal to the instruction processing circuitry, but not the cache coherency circuitry, when the integrated circuit transitions to the first reduced power consumption mode responsive to a power-down signal and in accordance with the configuration signal; and (2) disable the clock signal to both the cache coherency and instruction processing circuitries when the integrated circuit transitions to the second reduced power consumption mode responsive to a power-down signal and in accordance with the configuration signal, and to temporarily enable the clock signal to the cache coherency circuitry in response to an input signal indicating a memory access when the integrated circuit is in the second reduced power consumption mode.

5. The integrated circuit of claim 4 wherein the input signal indicates a memory access by a device external to the integrated circuit.

6. The integrated circuit of claim 5 wherein the device is coupled to a systems bus of a computer system including the integrated circuit.

7. A computer system including:

a processor bus;

a processor coupled to the processor bus;

a systems bus;

a peripheral device coupled to the systems bus;

a main memory accessible by the processor and the peripheral device; and a cache memory accessible by the processor;

wherein the processor is operable in a full-power consumption mode and in first and second reduced power consumption modes, and comprises:

a configuration input to receive a configuration signal, the configuration signal indicating whether the integrated circuit transitions from the full-power consumption mode to either the first or the second reduced power consumption mode;

cache coherency circuitry to maintain coherency between the main and cache memories;

instruction processing circuitry to process instructions within the integrated circuit; and power-reduction circuitry to:

(1) disable a clock signal to the instruction processing circuitry, but not the cache coherency circuitry, when the integrated circuit transitions to the first reduced power consumption mode responsive to a power-down signal and in accordance with the configuration signal; and (2) disable the clock signal to both the cache coherency and instruction processing circuitries when the integrated circuit transitions to the second reduced power consumption mode responsive to a power-down signal and in accordance with the configuration signal, and to temporarily enable the clock signal to the cache coherency circuitry in response to an input signal indicating a memory access when the integrated circuit is in the second reduced power consumption mode.

8. A method of transitioning an integrated circuit between a full-power state and either a first or a second reduced power state, the integrated circuit including a first set of functional units required for the performance a cache coherency operation and a second set of functional units not required for the performance of a cache coherency operation, the method comprising:

responsive to detection of a power down signal, determining a state of a configuration indication set in accordance with a configuration signal to specify a transition between the full-power state and either the first or the second reduced power state;

if the configuration indication is set to a first state, then gating a clock signal to the second set of functional units so as to transition the integrated circuit from the full-power state to the first reduced power state; and if the configuration indication is set to a second state, then transitioning the integrated circuit from the full-power state to the second reduced power state wherein a clock signal is gated to both the first and second sets of functional units within the integrated circuit and the clock signal is propagated to the first set of functional blocks, but not to the second set of functional units, in response to a signal indicating a memory access by a device external to the integrated circuit.

9. The method of claim 8 including, if the configuration indication is set to the second state, gating the clock signal to the first set of function units on completion of a cache coherency operation by the first set of functional units.

10. The method of claim 8 wherein the first set of functional units includes a bus interface unit.

11. A method of configuring an integrated circuit to maintain cache coherency when operating in both first and second reduced power consumption modes the method comprising:

determining whether a configuration signal occupied a first or second state at a predetermined configuration instance;

if the configuration signal occupied the first state, then configuring the integrated circuit to enter a first reduced power consumption mode in which instruction processing circuitry is powered down, and cache coherency circuitry is powered; and if the configuration signal occupied the second state, then configuring the integrated circuit to enter a second reduced power consumption mode in which both the instruction processing and cache coherency circuitries are powered down, and in which the cache coherency circuitry is temporarily powered-up in response to a signal indicating a memory access.

12. The method of claim 11 including detecting assertion of the signal that indicates a memory access by an external device.

13. The method of claim 12 wherein the external device is a peripheral device included within a computer system of which the integrated circuit is a part.

14. Power-reduction logic, associated with an integrated circuit including a first set of functional units required to perform a cache coherency operation and a second set of functional units not required to perform a cache coherency operation, the power-reduction logic comprising:

a first input to receive a power reduction signal;

a second input to receive a configuration signal indicative of whether the integrated circuit, associated with the power-reduction logic, transitions from a power-up mode to either a first or a second power-down mode responsive to assertion of the power reduction signal;

a third input to receive an access signal indicative of a memory access; and clock disable circuitry to disable a clock signal to the first set of functional units, but not the second set of functional units, of the integrated circuit when the integrated circuit is in the first power-down mode, and to disable the clock signal to both the first and second sets of functional units of the integrated circuit when the integrated circuit is in the second power-down mode, but temporarily to enable the clock signal to the first set of functional units responsive to an assertion of the access signal so as to enable the first set of functional units to perform a cache coherency operation responsive to the assertion of the access signal, before again disabling the clock signal to the first set of functional units.

15. The integrated circuit of claim 4 including a clock spine that carries the clock signal and Phase Lock Loop circuitry coupled to receive a reference clock signal and to be fed back the clock signal for the purpose of locking the clock signal.

16. The integrated circuit of claim 15 wherein the power-reduction circuitry includes a gate associated with each of a plurality of functional units that comprise the instruction processing circuitry and the cache coherency circuitry, the power-reduction circuitry including first disabling circuitry to operate each of the respective gates associated with each of the respective functional units of the instruction processing circuitry to gate the clock signal carried on the clock spine when the integrated circuit is in the first reduced power consumption mode, and the power-reduction circuitry including second disabling circuitry selectively to operate each of the respective gates associated with each of the functional units of both the cache coherency and the instruction processing circuitries to gate the clock signal carried on the clock spine when the integrated circuit is in the reduced power consumption made and temporarily to enable the functional units of the cache coherency circuitry to perform the cache coherency operation responsive to the assertion of the input signal including the memory access.

17. The integrated circuit of claim 16 wherein the first and second disabling circuitries is operate together when the integrated circuit is in the second reduced-power consumption mode temporarily to enable the functional units of the cache coherency circuitry to perform the cache coherency operation responsive to the assertion of the access signal, while retaining the instruction processing circuitry in a power-down state.

18. The integrated circuit of claim 17 wherein the first disabling circuitry operates only the gates associated with the functional units of the instruction processing circuitry, and the second disabling circuitry operates only the gates associated with the functional units of the cache coherency circuitry.

19. The integrated circuit of claim 15 wherein the power-reduction circuitry is to disable the Phase Lock Loop circuitry when the integrated circuit is in a third reduced power consumption mode, and to maintain the Phase Lock Loop circuitry in an active state when the integrated circuit is in either the first and second reduced power consumption modes so as to maintain the clock signal on the clock spine.

20. The method of claim 8 wherein the integrated circuit includes a clock spine that carries the clock signal and Phase Lock Loop circuitry coupled to receive a reference clock signal and to be fed back the clock signal for the purpose of locking the clock signal, the method including disabling the Phase Lock Loop circuitry so as to transition the integrated circuit from the full-power state to a third reduced power state.

21. The method of claim 20 including maintaining the Phase Lock Loop circuitry active when the integrated circuit is in either the first and second reduced power states so as to maintain the clock signal on the clock spine.

22. The method of claim 20 wherein the power-reduction circuitry includes a gate associated with each of a plurality of functional units that comprise the first and second sets, the method including operating each of the respective gates associated with each of the respective functional units of the first set to gate the clock signal carried on the clock spine when the integrated circuit is in the first reduced power state, and the method further including selectively operating each of the respective gates associated with each of the functional units of both the first and second sets to gate the clock signal carried on the clock spine when the integrated circuit is in the second reduced power state temporarily to enable only the functional units of the second set to perform the cache coherency operation responsive to the assertion of the access signal.

23. An integrated circuit operable in a full-power consumption mode and in first and second reduced power consumption modes, the integrated circuit comprising:

a configuration means to receive a configuration signal, the configuration signal indicating whether the integrated circuit transitions from the full-power consumption mode to either the first or the second reduced power consumption mode;

cache coherency means for maintaining coherency between a main memory and a cache memory accessible by the integrated circuit;

instruction processing means for processing instructions within the integrated circuit; and power reduction means for:

(1) disabling a clock signal to the instruction processing circuitry, but not the cache coherency circuitry, when the integrated circuit transitions to the first reduced power consumption mode responsive to a power-down signal and in accordance with the configuration signal; and (2) disabling the clock signal to both the cache coherency and instruction processing circuitries when the integrated circuit transitions to the second reduced power consumption mode responsive to a power-down signal and in accordance with the configuration signal, and for temporarily enabling the clock signal to the cache coherency processing circuitry in response to an input signal indicating a memory access when the integrated circuit is in the second reduced power consumption mode.

24. Power-reduction logic, associated with an integrated circuit including a first set of functional units required to perform a cache coherency operation and a second set of functional units not required to perform a cache coherency operation, the power-reduction logic comprising:

first input means for receiving a power reduction signal;

second input means for receiving a configuration signal indicative of whether the integrated circuit, associated with the power-reduction logic, transitions from a power-up mode to either a first or a second power-down mode responsive to assertion of the power reduction signal;

third input means for receiving an access signal indicative of a memory access; and clock disabling means for disabling a clock signal to the first set of functional units, but not the second set of functional units, of the integrated circuit when the integrated circuit is in the first power-down mode, and for disabling the clock signal to both the first and second sets of functional units of the integrated circuit when the integrated circuit is in the second power-down mode, but for temporarily enabling the clock signal to the first set of functional units responsive to an assertion of the access signal so as to enable the first set of functional units to perform a cache coherency operation responsive to the assertion of the access signal.

* * * * *

UNITED STATES PATENT AND TRADEMARK OFFICE
CERTIFICATE OF CORRECTION

PATENT NO.  : 6,014,751
DATED       : January 11, 2000
INVENTOR(S) : Kardach et al.

It is certified that error appears in the above-identified patent and that said Letters Patent is hereby corrected as shown below:

In column 3, at line 64, delete "detktop" and insert --desktop--.

In column 6, at line 24, delete "sower" and insert --power--.

In column 6, at line 26, delete "Accordinly" and insert --Accordingly--.

In column 7, at line 30, delete "L36" and insert --136--.

In column 7, at line 59, delete "include", and insert --includes--.

In column 9, at line 13, delete "112" and insert --142--.

In column 10, at line 41, delete "bow" and insert --box--.

Signed and Sealed this

Twenty-sixth Day of December, 2000

*Attest:*

Q. TODD DICKINSON

*Attesting Officer*  *Director of Patents and Trademarks*

UNITED STATES PATENT AND TRADEMARK OFFICE
CERTIFICATE OF CORRECTION

PATENT NO.        : 6,014,751
APPLICATION NO. : 08/841858
DATED             : January 11, 2000
INVENTOR(S)       : Kardach et al.

Page 1 of 1

It is certified that error appears in the above-identified patent and that said Letters Patent is hereby corrected as shown below:

In Claim #14, line 14, please delete "first" and insert -- second --.
In Claim #14, line 15, please delete "second" and insert -- first --.
In Claim #24, line 32, please delete "first" and insert -- second --.
In Claim #24, line 32, 9$^{th}$ word, please delete "second" and insert -- first --.

Signed and Sealed this

Twenty-ninth Day of January, 2008

JON W. DUDAS
*Director of the United States Patent and Trademark Office*